Figure 1:
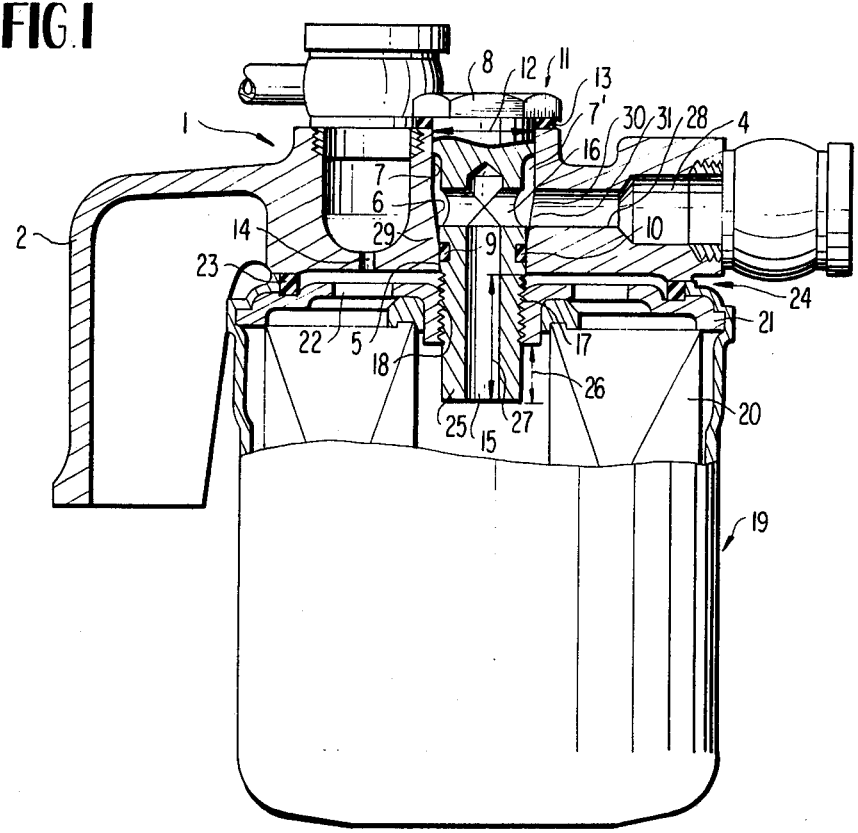

United States Patent [19]

Conrad et al.

[11] 4,051,036
[45] Sept. 27, 1977

[54] FILTER FOR LIQUIDS
[75] Inventors: Ulrich Conrad, Ludwigsburg; Gerd Niemeier, Stuttgart, both of Germany
[73] Assignee: Daimler-Benz Aktiengesellschaft, Germany
[21] Appl. No.: 654,909
[22] Filed: Feb. 3, 1976
[30] Foreign Application Priority Data
Feb. 7, 1975 Germany ............................ 2505091
June 7, 1975 Germany ............................ 2525526
[51] Int. Cl.² ............................................. B01D 27/08
[52] U.S. Cl. ............................ 210/232; 210/DIG. 17; 210/444
[58] Field of Search ............... 210/133, 232, 234, 438, 210/440, 443, 444, 452; 85/1 R

[56] References Cited
U.S. PATENT DOCUMENTS

| 1,783,924 | 12/1930 | McKinley | 210/444 X |
| 1,873,795 | 8/1932 | Sweetland | 210/444 |
| 2,511,800 | 6/1950 | Wilkinson | 210/440 X |
| 2,588,519 | 3/1952 | Guiot | 210/436 |
| 3,396,996 | 8/1968 | Raptis | 85/1 R |
| 3,457,573 | 7/1969 | Patina et al. | 85/1 R |
| 3,685,659 | 8/1972 | Heskett et al. | 210/444 |

FOREIGN PATENT DOCUMENTS

| 783,203 | 7/1935 | France | 210/444 |
| 616,696 | 7/1935 | Germany | 55/487 |
| 1,339,895 | 12/1973 | United Kingdom | 210/444 |

Primary Examiner—Theodore A. Granger
Attorney, Agent, or Firm—Craig & Antonelli

[57] ABSTRACT

A filter for liquids with a filter head provided with inlet and outlet channels and with a filter body arranged therebelow which is retained at the filter head by a central threaded connection, and in which the discharge of the liquid takes place centrally; a bolt engaging by means of a thread in the filter body is thereby provided to establish the threaded connection which is in communication by way of a coaxial dead-end bore and a cross bore, on the one hand, with the interior of the filter body and, on the other hand, with the outlet channel in the filter head; a sealing ring is provided between the thread of the bolt and the cross bore which provides a radial seal in the filter head with respect to the bolt bore.

10 Claims, 2 Drawing Figures

FILTER FOR LIQUIDS

The present invention relates to a filter for liquids, especially for fuels, which consists of a filter head with inlet and outlet channels and possibly with venting means and of a filter body arranged therebelow which is retained at the filter head by a central threaded connection and in which the discharge of the liquid takes place centrally.

Filters for liquids are known in the art in which the filter body is provided with a separate filter body bottom. The entire structure is held together by a centrally arranged bolt (German Auslegeschrift No. 1,001,972, German Offenlegungsschrift No. 1,536,766).

These prior art filters entail the disadvantage that the liquid present in the filter head and in the filter body flows off toward the outside during the filter exchange or during the disengagement of the central connecting bolt and as a result of poor accessibility can be connected by means of another vessel or container possibly only in a complicated manner.

Furthermore, filters are known in the art, in which the filter body in its entirety is screwed into the filter head by means of a central threaded stud or vice versa (German Offenlegungsschrift No. 1,611,120, German Offenlegungsschrift No. 1,536,796).

These filter bodies, however, are sealed off by means of a relatively large-surfaced seal against the filter head and can be disengaged after longer operating periods only with great difficulties, for which purpose a corresponding space and/or special tool is then required in order to be able to carry out the necessary manipulations.

The present invention is concerned with the task to provide a readily interchangeable filter for liquids which avoids the described disadvantages, is readily accessible during the filter exchange and loses toward the outside only a negligible liquid quantity during the exchange.

Additionally, the present invention is concerned with the task of simplifying the assembly of the central threaded connection having the sealing ring into the threaded bore and to preclude damages at the sealing ring also after a repeated exchange or disengagement of the filter body.

These tasks are solved according to the present invention in that for purposes of the threaded connection, a bolt engaging by means of a thread in the filter body is provided which is connected by a dead-end bore and a cross bore, on the one hand, with the interior of the filter body and, on the other, with the discharge channel in the filter head, and in that a sealing ring establishing a radial seal with respect to the threaded bore in the filter head, is provided between the thread of the bolt and the cross bore.

It is achieved thereby that after the loosening or disengagement of the bolt which is readily accessible from the outside, the filter body can be removed in its entirety.

Furthermore, the threaded bore in the filter head may be offset above the sealing ring to a larger diameter by means of a conical transition and the bolt may have a corresponding diameter within the area of its head. The sealing ring which may, for example, possess the form of an O-ring, separates the filtered from the unfiltered liquid. Additionally, the bolt within the area of the conical transition may be so constructed in diameter that an annular space is formed between the bolt and the threaded bore in the filter head. As a result thereof, the liquid can flow off unimpaired and with full channel cross section in every position of the cross bore of the bolt.

Furthermore, the sealing ring may be arranged in a groove provided at the bolt shank. The bolt and the sealing ring thereby form a unit and can be easily inserted and assembled by reason of the conical transition from the large to the small diameter of the bolt bore.

Additionally, the discharge or outlet channel may terminate in the bolt bore with the bottom edge of the outlet channel located above the termination of the conical transition.

As a result thereof, the sealing ring cannot become stuck in the bolt bore at the orifice contour of the discharge or outlet channel and therefore cannot be damaged. The outer diameter of the sealing ring abuts at the wall of the conical transition only below the bottom edge of the terminating discharge channel in the bolt bore.

In order to collect the air taken along in the liquid above the opening of the bolt dead-end bore and to empty the same into the tank by way of a throttle bore, the bolt may extend so far into the filter body that the opening of the dead-end bore lies considerably below the upper edge of the filter body.

In a filter with an at least approximately horizontally extending separating plane between the filter head and the filter body, the volume between the filter head and separating plane can be very small. The filter body can still absorb, for the most part, the liquid present in the filter head during a filter change.

In order to avoid a splashing over or spurting out of the liquid during the filter exchange in the filter body, the filter head may extend into the filter body below the separating plane.

Accordingly, it is an object of the present invention to provide a filter for liquids which avoids by simple means the aforementioned shortcomings and drawbacks encountered in the prior art.

Another object of the present invention resides in a filter for liquids in which the liquid present in the filter body and in the filter head cannot flow off toward the outside during the filter exchange or upon disengagement of the central connecting bolt.

Another object of the present invention resides in a filter for liquids, especially for fuels, in which the need for collecting the outflowing liquid by means of another vessel is eliminated.

Still a further object of the present invention resides in a filter for liquids which can be readily loosened without the need of special tools and/or a large amount of working space.

Another object of the present invention resides in a filter for liquids which is readily accessible during the exchange of the filter and which loses at most a negligible liquid quantity during the exchange.

Still another object of the present invention resides in a filter for liquids in which the filter body can be removed in its entirety after the loosening of the bolt which is readily accessible from the outside.

A still further object of the present invention resides in a filter of the type described above in which the liquid can flow off without impairment and with its full channel cross section in every position of the cross bore of the bolt.

Another object of the present invention resides in a filter in which the bolt and sealing ring can be readily installed without danger of damage to the sealing ring, even after repeated interchange or loosening of the filter body.

Figure 2:
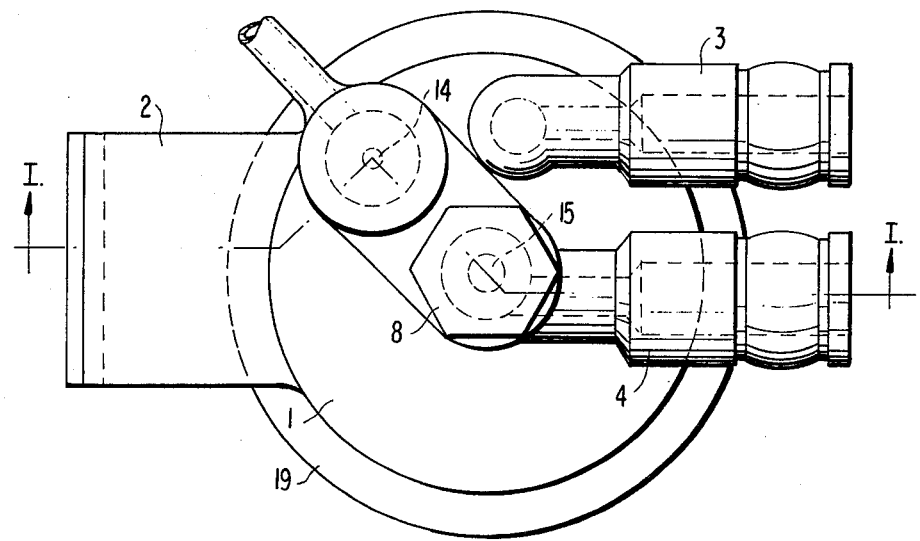

These and further objects, features and advantages of the present invention will become more apparent from the following description when taken in connection with the accompanying drawing which shows, for purposes of illustration only, one embodiment in accordance with the present invention, and wherein:

FIG. 1 is an elevational view, partly in cross section, of a filter in accordance with the present invention; and FIG. 2 is a plan view on the filter of FIG. 1 in accordance with the present invention.

Referring now to the drawing wherein like reference numerals are used throughout the two views to designate like parts, the subject matter of the present invention illustrated in FIGS. 1 and 2 consists of a filter head generally designated by reference numeral 1 which is connected by means of a fastening bracket 2 or the like, for example, with a vehicle frame or chassis or other suitable fixed part (not shown). Inlet and outlet (discharge) channels 3 and 4 are provided on the filter head 1. A bolt bore 5 is arranged in central location at the filter head 1 which is offset by a conical transition 6 to a larger diameter 7. Within the area of the conical transition 6, an annular space 7' is provided for the liquid.

The bolt bore 5 serves for receiving a bolt 8 which carries in a groove 9 a sealing ring 10, for example, an O-ring. The bolt 8 has within the area of the head 11 a diameter 12 corresponding to the bore diameter 7. Underneath the bolt head 11, a further seal 13 establishing a seal with respect to the outside is provided. A throttle bore 14 for the continuous venting is arranged in the filter head 1 which may be connected, for example, with a fuel tank (not shown). The bolt 8 includes a dead-end bore 15 and a cross bore 16 which are in communication by way of the annular space 7' with the outlet channel 4. With its thread 17 ending below the groove 9, the bolt 8 engages in a corresponding threaded bore 18 of a filter body 19 which is equipped with a filter insert 20.

The filter body generally designated by reference numeral 19 which is constructed as throw-away part, includes apertures 22 in the upper covering 21 for the passage of the in-flowing, non-filtered liquid. A sealing ring 23 seals off the separating plane 24 between the filter head 1 and the filter body 19. The bolt 8 projects with an end 25 provided with the dead-end bore 15 into the filter body 19 a distance 26 and forms above the end 25 a venting zone 27. After the loosening of the bolt 8, the filter body 19 together with the liquid contents can be readily removed.

The concial transition 6 from the larger diameter 7 to the bolt bore 5 is provided according to the present invention to enable an easier assembly of the sealing ring 10. The outlet or discharge channel 4 terminating in the bolt bore 5 is thereby so arranged that the bottom edge 28 of the discharge channel 4 lies above the termination 29 of the conical transition 6. The outer diameter of the sealing ring 10 thereby abuts at the wall 30 of the transition 6 only below the bottom edge 28 and cannot be damaged during installation or assembly by a sharp edge 31 formed within this area.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A filter for liquids comprising:
    a filter head including an inlet channel, a discharge channel, and a bore extending downwardly through said filter head, said bore having a first diameter tapering downwardly to a second smaller diameter providing a conically shaped bore portion;
    a filter body located below said filter head;
    a bolt member inserted through said bore and threadedly connected to said filter body for connecting said filter body to said filter head, said bolt member having a first shank portion with a diameter corresponding to said first diameter and a second shank portion with a diameter corresponding to said second smaller diameter, and said bolt member communicating said filter body with said discharge channel by means of a dead-end bore and a full cross-bore through said bolt member, said cross-bore and said discharge channel communicating through an annular chamber surrounding said bolt member at the conically shaped portion of said bore in said filter head; and
    sealing ring means constructed and arranged in a groove in said second smaller diameter shank portion of said bolt member for sealing said downwardly extending bore in said filter head, whereby said sealing ring means is inwardly compressed in said groove by the conically shaped portion of said bore upon insertion of said bolt member into said bore.

2. A filter according to claim 1, wherein said bolt member projects into said filter body below the upper edge of said filter body sufficiently to form a venting space in said filter body.

3. A filter according to claim 2, wherein an approximately horizontally extending separating plane is provided between said filter head and said filter body with said filter head being minimally spaced from said separating plane.

4. A filter according to claim 3, wherein said filter head includes a portion extending toward said filter body below said separating plane.

5. A filter according to claim 4, wherein said discharge channel terminates in said annular chamber above said second smaller diameter of said downwardly extending bore through said filter head.

6. A filter according to claim 1, wherein an approximately horizontally extending separating plane is provided between said filter head and said filter body with said filter head being spaced minimally from said separating plane.

7. A filter according to claim 6, wherein said filter head includes a portion extending toward said filter body below said separating plane.

8. A filter according to claim 1, wherein said discharge channel terminates in said annular chamber above said second smaller diameter of said downwardly extending bore through said filter head.

9. A filter according to claim 1, wherein said sealing ring means is inwardly compressed by said conically shaped portion below the termination of said discharge channel in said annular chamber.

10. In a filter for liquids of the type comprising a filter head, a filter body, connecting means for connecting said filter body to said filter head with said connecting means providing communication for liquids between said filter head and said filter body, wherein said connecting means includes a bolt member extending through said filter head and threadedly engaging said filter body, and sealing means associated with said connecting means for sealing said filter head from said filter body, the improvement comprising means for guiding insertion of said bolt member into said filter head to engage said filter body while preventing damage of said sealing means, wherein said means for guiding insertion includes a bore extending through said filter head with said bore conically tapering in the direction of insertion from a first diameter to a second smaller diameter, and wherein said bolt member has a shank portion having a corresponding diameter to said second smaller diameter of said conically tapering bore, and said sealing means are associated with said shank portion of said bolt member in the zone of said second smaller diameter of said bore, whereby said sealing means is inwardly compressed at said shank portion by the conically tapering bore upon insertion of said bolt member into said bore.

* * * * *